United States Patent
Porte et al.

(10) Patent No.: US 9,139,306 B2
(45) Date of Patent: Sep. 22, 2015

(54) FASTENING DEVICE PARTICULARLY SUITABLE FOR THE FASTENING BETWEEN AN AIR INTAKE AND AN ENGINE OF AN AIRCRAFT NACELLE

(75) Inventors: Alain Porte, Colomiers (FR); Stéphane Dida, Fontenilles (FR); Matthieu Fargues, Montauban (FR); Martial Marro, Plaisance du Touch (FR); Emeric Chancerelle, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 13/566,624

(22) Filed: Aug. 3, 2012

(65) Prior Publication Data
US 2013/0032669 A1 Feb. 7, 2013

(30) Foreign Application Priority Data
Aug. 5, 2011 (FR) ...................... 11 57202

(51) Int. Cl.
 *B64C 1/06* (2006.01)
 *B64D 33/02* (2006.01)
 *F01D 25/24* (2006.01)
 *F01D 21/04* (2006.01)
 *F02C 7/04* (2006.01)

(52) U.S. Cl.
 CPC .............. *B64D 33/02* (2013.01); *F01D 25/243* (2013.01); *B64D 2033/0206* (2013.01); *B64D 2033/0286* (2013.01); *F01D 21/045* (2013.01); *F02C 7/04* (2013.01); *Y02T 50/672* (2013.01)

(58) Field of Classification Search
 USPC ........................................................ 244/131
 See application file for complete search history.

(56) References Cited

U.S. PATENT DOCUMENTS

| | | | | | |
|---|---|---|---|---|---|
| 3,763,874 | A | * | 10/1973 | Wilde et al. ................ | 137/15.1 |
| 4,037,809 | A | * | 7/1977 | Legrand ........................ | 244/54 |
| 4,658,579 | A | * | 4/1987 | Bower et al. ................. | 60/226.1 |
| 5,390,878 | A | * | 2/1995 | Padden ....................... | 244/53 R |
| 5,737,914 | A | * | 4/1998 | Porte et al. .................. | 60/226.1 |

(Continued)

FOREIGN PATENT DOCUMENTS

| | | |
|---|---|---|
| EP | 1 277 919 A1 | 1/2003 |
| FR | 2 936 223 A1 | 3/2010 |
| GB | 2 010 434 A | 6/1979 |

OTHER PUBLICATIONS

French Search Report for Application Serial No. FR 1157202 dated Apr. 10, 2012.

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

An aircraft nacelle with a connecting device between a first conduit of an air intake and a second conduit of a motor, both conduits being arranged end-to-end, the connecting device including an annular flange connected to the air intake, an annular flange connected to the motor pressed against annular flange of the air intake, the flanges extending in a plane perpendicular to the longitudinal axis of the nacelle; bolt holes formed in annular flanges and disposed plumb to one another; and connecting elements located in bolt holes, for connecting the annular flanges, wherein at least one flange includes at least one opening interposed between a bolt hole and junction zone of the flange and/or between a bolt hole and outer edge of the flange.

12 Claims, 4 Drawing Sheets

(56) References Cited

U.S. PATENT DOCUMENTS

| | | | |
|---|---|---|---|
| 5,893,534 A * | 4/1999 | Watanabe | 244/119 |
| 6,042,055 A * | 3/2000 | Messinger | 244/131 |
| 6,267,327 B1 * | 7/2001 | Siefker | 244/53 R |
| 7,635,106 B2 * | 12/2009 | Pham et al. | 244/131 |
| 7,748,661 B2 * | 7/2010 | Harris et al. | 244/131 |
| 2,936,223 A1 | 7/2011 | Porte et al. | |

* cited by examiner

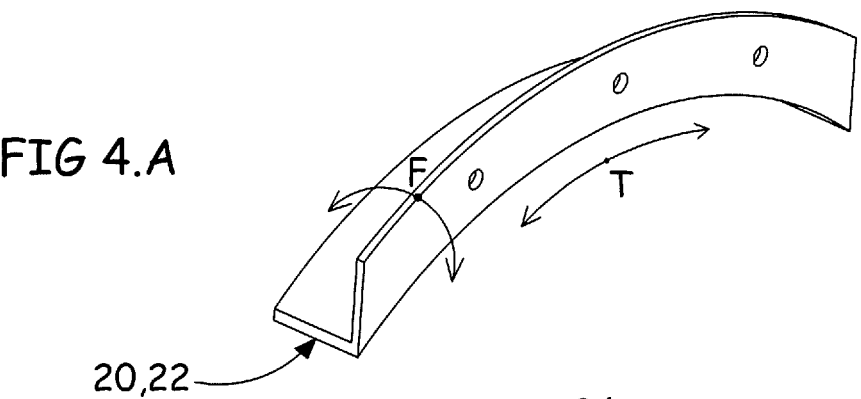
FIG 4.A
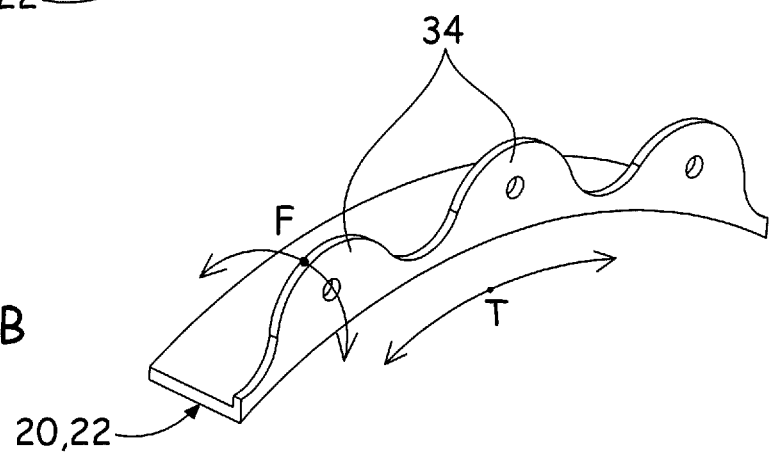
FIG 4.B
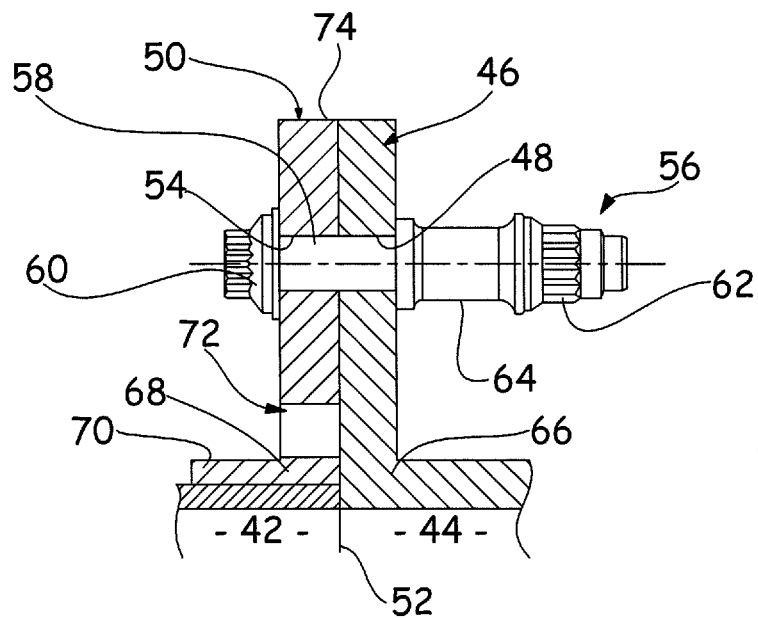
FIG 5

FASTENING DEVICE PARTICULARLY SUITABLE FOR THE FASTENING BETWEEN AN AIR INTAKE AND AN ENGINE OF AN AIRCRAFT NACELLE

CROSS-REFERENCE TO RELATED APPLICATION

This application claims the benefit of and priority to French Patent Application No. 11 57202 filed Aug. 5, 2011, the entire disclosure of which is herein incorporated by reference.

TECHNICAL FIELD

The present invention relates to an aircraft nacelle with an improved connecting device between an air intake and an motor system.

BACKGROUND

An aircraft propulsion unit comprises a nacelle in which lays substantially concentrically a motor system connected by means of a pylon to the rest of the aircraft.

SUMMARY

As illustrated in FIG. 1, the nacelle comprises a front air intake 10 to channel air flow toward motor 12.

Air intake 10 comprises a lip 14 whose surface in contact with the aerodynamic flow extends inside the nacelle through an internal conduit 16 of substantially circular sections and outside said nacelle through an outer wall 18 of substantially circular sections.

Air intake 10 is connected to motor 12 by a connecting device illustrated in detail in FIGS. 2 and 3. This connecting device includes at the motor level a first annular flange 20 secured to a second annular flange 22 of a panel defining conduit 16 or of a spacer 24, called bridle, connected to the panel defining conduit 16, as illustrated in FIG. 2. Both flanges 20 and 22 are pressed one against the other and thus held with connecting elements 26, e.g., bolts or rivets, which pass through flanges 20, 22 and extend parallel to the longitudinal axis of the nacelle.

According to one embodiment illustrated in FIG. 3, bolts or rivets 26 comprise a rod 28 which diameter is less than or equal to that of the bolt holes formed in annular flanges 20 and 22.

The connecting device and more particularly the bolts or rivets 26 are sized to ensure the transmission of stresses between the air intake and the motor, and to mitigate the risks of potential incidents, such as a broken blade of the fan.

When a blade of the motor fan breaks, the motor conduit can be deformed over all or part of its periphery. The deformations of the motor conduit tend to propagate in the direction of conduit 16 of the air intake. Therefore, it is necessary to take such deformations into account when designing conduit 16 of the air intake, which is usually made of composite material and includes an acoustic treatment system.

In order to limit the deformation propagation from annular flange 20 of the motor to flange 22 of the air intake, it is possible to provide a filter at the level of connecting elements 26. For each connecting device, the filter comprises at least one deformable sleeve 30 slipped over rod 28 of connecting element 26. In the example shown in FIG. 3, deformable sleeve 30 is interposed between annular flange 20 connected to the motor and nut 32 of connecting element 26. Said sleeve 30 has a deformable inner diameter adjusted to that of rod 28 and comprises a relatively thin central portion so as to enable it to deform, in particular by buckling. Thanks to its deformation, sleeve 30 allows a relative movement between the two annular flanges. Such relative movement is limited and mainly oriented along the axial direction.

According to one embodiment shown in FIG. 4A, annular flange 20 or 22 may have an L-shape section substantially constant over the periphery. Said flange profile offers a great resistance to warping along the longitudinal axis of the nacelle as shown by double arrow T as well as a high bending strength along an axis tangent to conduit 16 and perpendicular to the longitudinal axis as illustrated by double arrow F.

Therefore, this type of flange profile is rigid and does not tend to absorb part of the energy by deformations in case a blade breaks.

In other applications, when two conduits are connected end-to-end through annular flanges, at least one of the annular flanges may include in the plane perpendicular to the longitudinal axis lobes 34 at a distance from each other, in which holes are made for the connecting elements, as shown in FIG. 4B. Even though this type of flange profile can deform more easily than that of 4A, and can provide a more significant relative movement between the two conduits than when using a deformable sleeve 30, it provides much less resistance to warping T than that provided by the profile in FIG. 4A. But, in the case of a connecting device between an air intake and a motor of an aircraft nacelle, flanges should provide a higher resistance to torsion.

Also, the present invention is intended to provide a connecting device especially adapted for connecting a motor and an air intake of an aircraft nacelle capable of absorbing by deformation part of the energy in case a blade breaks, while maintaining a high resistance to warping.

To this effect, the invention relates to an aircraft nacelle with a connecting device between a first conduit of an air intake and a second conduit of a motor, both conduits being placed end-to-end; said connecting device comprising an annular flange connected to the air intake, an annular flange connected to the motor pressed against the annular flange of the air intake, said flanges extending in a plane perpendicular to the longitudinal axis of the nacelle; a plurality of bolt holes formed in the annular flanges, disposed plumb over each other, and connecting elements fitting in the bolt holes for connecting said annular flanges; wherein at least one flange comprises at least one opening interposed between a bolt hole and the junction zone of the flange, and/or between a bolt hole and the outer edge of the flange.

This solution enables to absorb by deformation part of the energy in case a blade breaks substantially along a radial direction.

BRIEF DESCRIPTION OF THE DRAWINGS

Other features and advantages will become apparent from the following invention description, provided only as examples, with reference to the accompanying drawings in which:

FIG. 4A is a view in perspective of a portion of a flange according to a first variant of prior art, FIG. 4B is a view in perspective of a portion of a flange according to another embodiment of prior art, FIG. 5 is a cross-section illustrating a connection device between a motor and an air intake of an aircraft nacelle according to a first embodiment of the invention.

DETAILED DESCRIPTION

Figure 1:
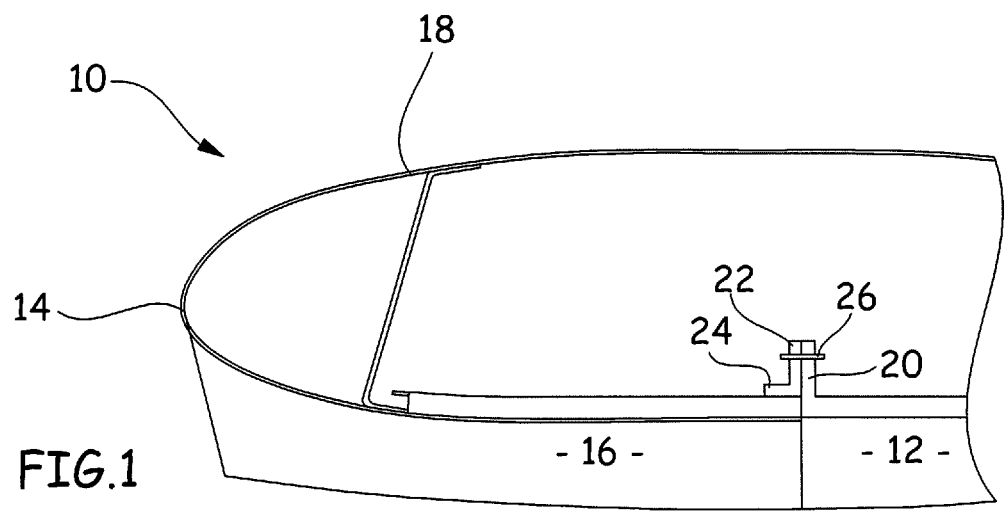
FIG. 1 is a schematic section along a radial plane of a portion of the front of an aircraft nacelle.
Figure 2:
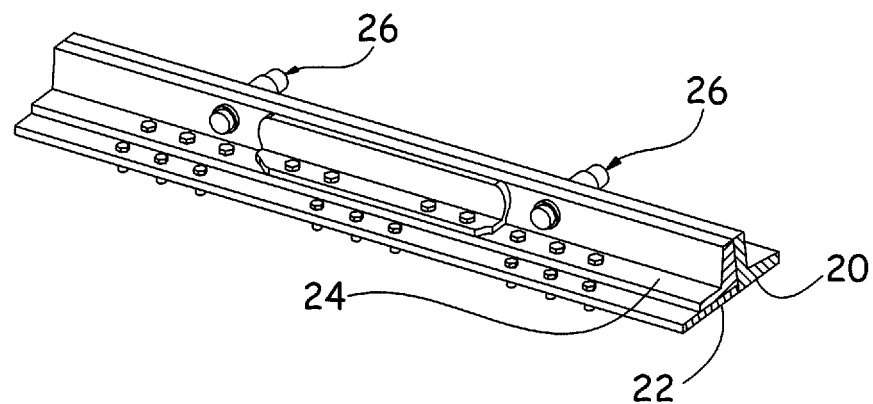
FIG. 2 is a view in perspective illustrating a portion of a connection between a motor and an air intake of an aircraft nacelle according to prior art.
Figure 3:
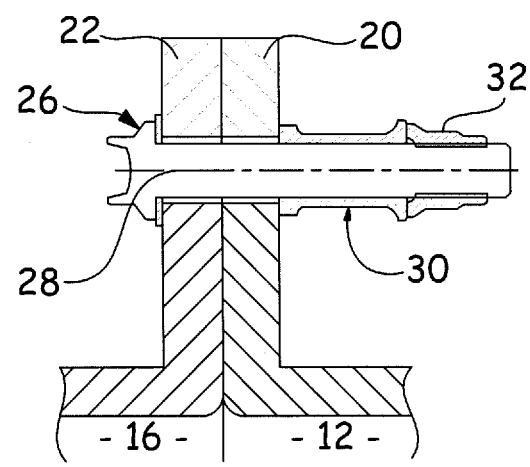
FIG. 3 is a cross-section illustrating a connection element between a motor and an air intake of an aircraft nacelle according to a first embodiment of prior art.

FIG. 5 shows a cross-section through the junction zone between a first conduit of an air intake 42 and a second conduit 44 of a motor of an aircraft nacelle, both conduits being arranged end-to-end. The cross-section plane contains the nacelle longitudinal axis and the axis of a connecting element.

According to one embodiment, the connecting device between a motor and an air intake comprises, at the motor level, an annular flange 46 extending in a plane substantially perpendicular to the longitudinal axis of the nacelle and comprising a plurality of bolt holes 48, at the air intake level, an annular flange 50 extending in a plane substantially perpendicular to the longitudinal axis of the nacelle, pressed against annular flange 46 of the motor at a junction plane referenced as 52, and having a plurality of bolt holes 54 disposed plumb over bolt holes 48 of the motor, and connecting elements 56 distributed on the periphery of annular flanges 46 and 50 located inside bolt holes 48 and 54, connecting elements 56 being oriented parallel to the longitudinal axis of the nacelle.

In some cases, an annular flange may be formed in one-piece with the motor or the air intake, or in the form of a bridle connected to the motor or the air intake.

Each connecting element 56 comprises a rod 58 in the form of a cylinder with, at a first end, a first support 60 susceptible to be pressed against the open face of one of the flanges, in this case the air intake annular flange 50, and, at the other end, a second support 62 susceptible to be pressed against the open face of the other flange, in this case the motor annular flange 46.

According to one embodiment, a connecting element 56 may be in the form of a bolt, with, on one hand, a screw having a shank with a head (corresponding to first support 60) at one extremity, and, at the other extremity, a thread, and, on the other hand, a nut (corresponding to second support 62) screwed on the extremity of the screw.

Alternatively, the connecting element may be in the form of a rivet with a rod having, at a first extremity, a head forming a first support and whose other extremity is deformed so as to form the second support.

Advantageously, connecting element 56 comprises a deformable sleeve 64 which can be slipped over rod 58 and interposed between one of the flanges and one of the supports. As illustrated in the example, deformable sleeve 64 is interposed between annular flange 46 of the motor and support 62 formed by a nut of the connecting element. Said sleeve 64 has a deformable inner diameter fitting that of rod 58 and comprises a relatively thin central portion so as to enable it to deform, in particular by buckling. Such arrangement increases the energy absorbed by deformation of the connecting device and thus limit the spread of deformations oriented along the axial direction.

The invention provides a connecting device to absorb, through plastic and elastic deformation, part of the energy produced during the impact of the blade against the motor conduit and to limit the spread of deformations between the motor conduit and the air intake conduit.

Each annular flange 46, 50 includes a junction area 66, 68 connecting it directly to the motor or to the air intake, or to a conduit 70 (visible in FIG. 5) itself connected to the motor conduit or to the air intake conduit.

According to the invention, at least one flange, preferably air intake flange 50, comprises at least one opening 72 interposed between a bolt hole 54 and junction zone 68 or between a bolt hole 54 and outer edge 74 of the flange.

Advantageously, for each bolt hole 54, a opening 72 is provided either between bolt hole 54 and junction zone 68 or between bolt hole 54 and outer edge 74 of the flange.

Said opening 72 has forms customized to reduce bending strength F with respect to prior art profile as illustrated in FIG. 4A.

Advantageously, for a given bolt hole, opening 72 is symmetrical with regards to a median plane P containing the longitudinal axis of the nacelle and the axis of the bolt hole.

Preferably, opening 72 has a U or V shape with branches arranged on either side of bolt hole 54.

According to one embodiment, opening 72 includes, on the one hand, a central portion 76 defined by two parallel edges 78, 78' substantially perpendicular to plane P, and arranged symmetrically on either sides of plane P, and on the other hand, two lobes 80, 80' arranged on either side of central portion 76, symmetrically with respect to plane P.

Figure 6:
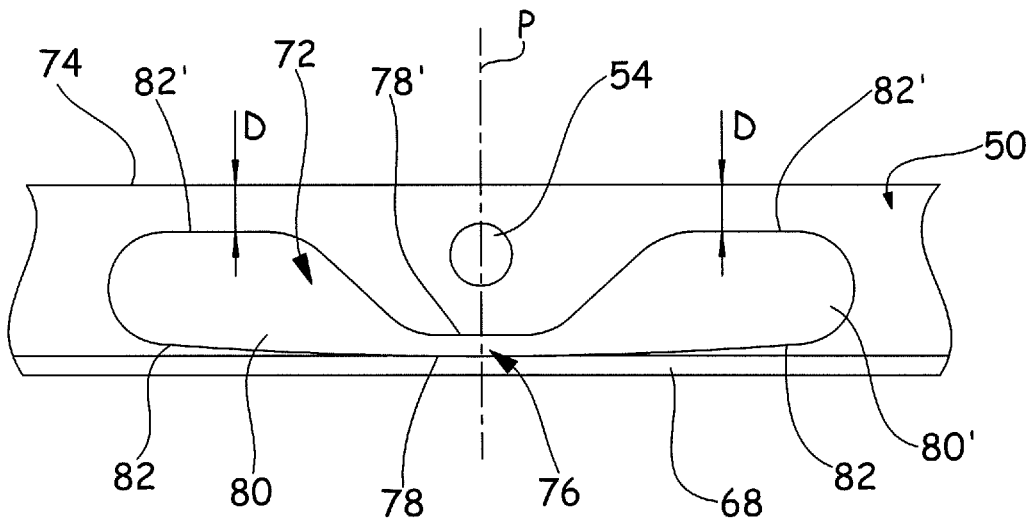
FIG. 6 is a front view of the air intake flange illustrated in FIG. 5.
Figure 7:
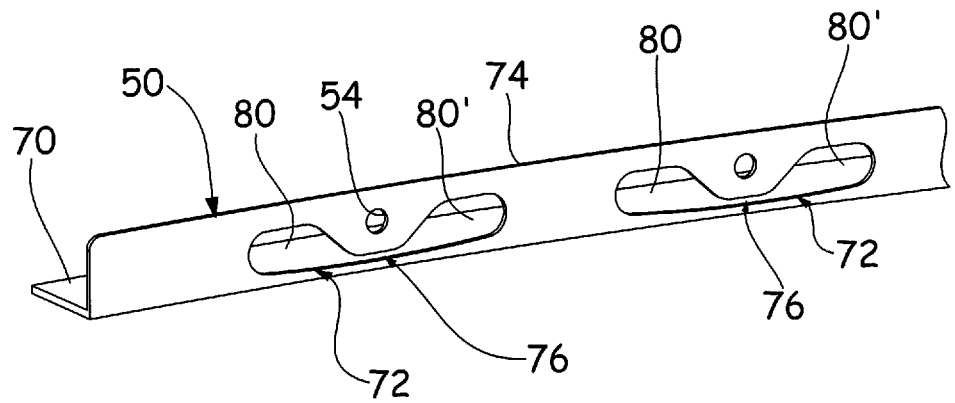
FIG. 7 is a view in perspective of a portion of the flange shown in FIG. 6.

According to a first variant illustrated in FIGS. 5 to 7, for a given bolt hole 54, opening 72 is arranged between the bolt hole and junction zone 68. Preferably, lower edge 78 of opening 72 is tangent to the outer surface of the conduit to which the flange is connected.

In this embodiment, as shown in detail in FIG. 6, opening 72 includes a central portion 76 whose edges 78, 78' are parallel and spaced by a distance of about 4 to 10 mm. Both lobes 80, 80' of the opening are delimited by two edges 82, 82' which respectively extend edges 78, 78', and which spacing increases progressively moving away from median plane P, both edges forming an angle of about 40°, then is substantially constant over a distance of about 2 to 4 cm and then decreases, both edges 82, 82' meeting, following an arc of a circle.

To ensure a reduction in bending F, edge 82' of each lobe is close to outer edge 74 of the flange, distance D separating it from said edge being substantially identical to that separating the bolt hole from edge 78' of central part 76.

The distance between bolt hole 54 and edges 78' and 82', and the distance D between edge 82' and outer edge 74 must be sufficient to receive the efforts between connecting elements 56 and junction area 68.

The distance between two consecutive opening 72 and the distance between opening 72 and bolt hole 54 and/or outer edge 74 of the flange should be sufficient to ensure a high warping strength, comparable to that of prior art.

In parallel, distance D between opening 72 and outer edge 74 must be less than a certain threshold to enable the flange to deform, particularly in flexion and to allow relative movement between the air intake and motor conduits.

Advantageously, distance D must have a value ranging between 20 and 40% of the flange height.

Figure 8:
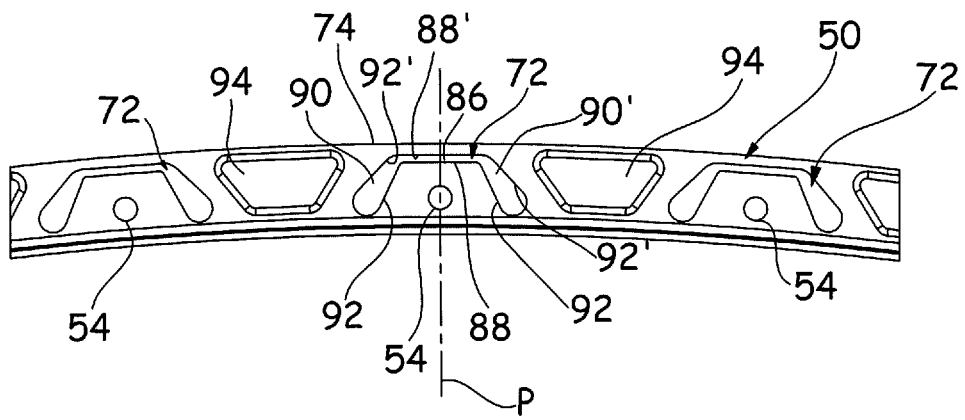
FIG. 8 is a front view of a portion of a flange according to another embodiment of the invention.
Figure 9:
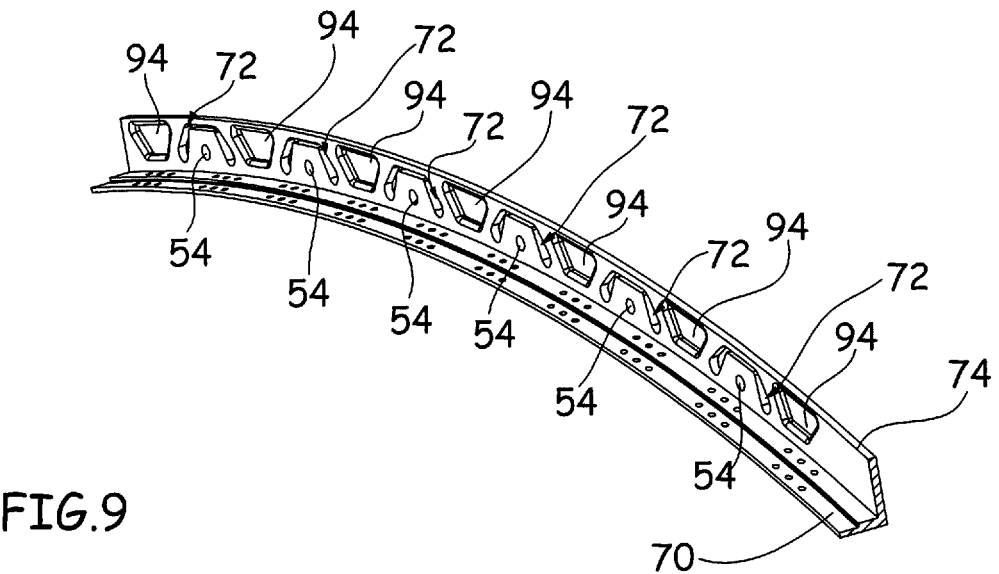
FIG. 9 is a view in perspective of a portion of the flange shown in FIG. 8.

According to another embodiment illustrated in FIGS. 8 and 9, for a given bolt hole 54, opening 72 is arranged between the bolt hole and outer edge 74 of the flange.

In this embodiment, as shown in detail in FIG. 8, opening 72 includes a central portion 86 whose edges 88, 88' are parallel and spaced by a distance of about 4 to 10 mm. Both opening lobes 90, 90' are delimited by two edges 92, 92' which extend edges 88, 88' respectively, and whose spacing increases progressively as it moves away from median plane P, then decreases, both edges 92, 92' meeting following an arc of a circle.

To ensure a reduction in bending F, edge 92 of each lobe comes close to junction zone 68. Advantageously, edge 92 of each lobe is tangent to the outer surface of the conduit to which the flange is connected.

The distance between edge 92' and outer edge 74 must be sufficient to ensure a high warping resistance, comparable to that of prior art.

According to another feature of the invention, the flange may include secondary openings 94 interposed between primary openings 72. Primary and secondary openings are arranged in an alternate fashion.

In this case, primary openings 72 and secondary openings 94 have shapes that enable them to form a lattice. Such configuration visible in FIGS. 8 and 9 can reduce the mass of the flange while keeping a high warping strength comparable to that provided by a flange of prior art as shown in FIG. 4A.

Advantageously, the distance between openings 72 and 94 and the distance from openings 72, 94 to outer edge 74 of the flange are substantially equal to b, and have a value between 20 and 40% of the height of the flange.

Figure 10:
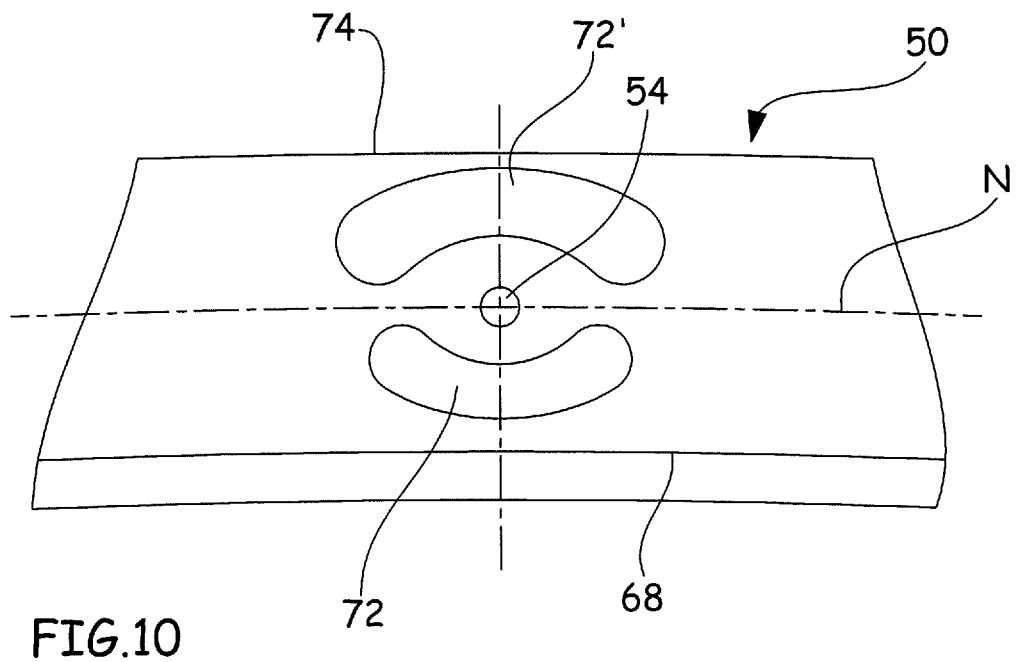
FIG. 10 is a front view of a portion of a flange according to another embodiment of the invention.

According to another variant illustrated in FIG. 10, flange 50 of air intake comprises an opening 72 interposed between a bolt hole 54 and junction area 68, and an opening 72' between a bolt hole 54 and outer edge 74 of the flange. Such solution preserves the continuity of neutral fiber N. In some cases, the shapes of openings 72, 72' may be substantially identical, whereas in others not. Preferably, openings 72, 72' are symmetrical with respect to a median plane containing the longitudinal axis of the nacelle and the axis of the bolt hole.

The invention claimed is:

1. An aircraft nacelle with a connecting device between a first conduit of an air inlet and a second conduit of a motor, both conduits being arranged end-to-end, said connecting device comprising:
   an annular flange connected to the air inlet and an annular flange connected to the motor pressed against the air inlet annular flange, said flanges extending in a plane perpendicular to the longitudinal axis of the nacelle;
   a plurality of bolt holes formed in the annular flanges and arranged plumb to each other; and
   a plurality of connecting elements disposed in the plurality of bolt holes for connecting said annular flanges;
   wherein at least one flange comprises at least one enclosed opening interposed between a first bolt hole and a junction zone of the flange and/or between the first bolt hole and an outer edge of the flange; and
   wherein the at least one enclosed opening comprises a central portion and two lobes delimited by two edges such that a width of the two lobes increases progressively going away from a median plane and then decreases, the two lobes being arranged on either side of the first bolt hole.

2. The aircraft nacelle according to claim 1, wherein the at least one opening is symmetrical in relation to a median plane containing the longitudinal axis of the nacelle and the axis of the bolt hole.

3. The aircraft nacelle according to claim 2, wherein the at least one opening is U- or V-shaped.

4. The aircraft nacelle according to claim 3, wherein both edges meet following an arc of a circle.

5. The aircraft nacelle according to claim 1, wherein the at least one opening is arranged between the first bolt hole and the junction zone.

6. The aircraft nacelle according to claim 5, wherein an edge of a lower opening is tangent to an outer surface of the conduit which is connected to the flange.

7. The aircraft nacelle according to claim 5, wherein a distance between the at least one opening and the outer edge of the flange has a value between 20 and 40% of a height of the flange.

8. The aircraft nacelle according to claim 1, wherein, the at least one opening is arranged between the first bolt hole and the outer edge of the flange.

9. The aircraft nacelle according to claim 8, wherein an edge of each of one or more lobes is tangent to the outer surface of the conduit which is connected to the flange.

10. The aircraft nacelle according to claim 1, wherein a first opening is arranged between the first bolt hole and the junction zone and a second opening is arranged between the first bolt hole and the outer edge of the flange.

11. The aircraft nacelle according to claim 1, wherein at least one of the flanges includes primary openings interposed between bolt holes and the junction zone of the flange, and/or between bolt holes and the outer edge of the flange, as well as secondary openings interposed between the primary openings.

12. The aircraft nacelle according to claim 11, wherein the primary openings and the secondary openings form a lattice.

* * * * *